United States Patent
Lenderink et al.

(10) Patent No.: US 7,156,627 B2
(45) Date of Patent: Jan. 2, 2007

(54) COMPRESSOR UNIT COMPRISING A CENTRIFUGAL COMPRESSOR AND AN ELECTRIC MOTOR

(75) Inventors: Gerardus Maria Lenderink, Rietmolen (NL); Antonius Bernardus Maria Nijhuis, Weerselo (NL)

(73) Assignee: Siemens Industrial Turbomachinery B.V., Ae Hengelo (NL)

( * ) Notice: Subject to any disclaimer, the term of this patent is extended or adjusted under 35 U.S.C. 154(b) by 264 days.

(21) Appl. No.: 10/480,011

(22) PCT Filed: May 24, 2002

(86) PCT No.: PCT/NL02/00336

§ 371 (c)(1),
(2), (4) Date: Apr. 16, 2004

(87) PCT Pub. No.: WO02/099286

PCT Pub. Date: Dec. 12, 2002

(65) Prior Publication Data

US 2004/0170505 A1    Sep. 2, 2004

(30) Foreign Application Priority Data

Jun. 5, 2001    (NL) .................................. 1018212

(51) Int. Cl.
*F04B 17/00* (2006.01)
(52) U.S. Cl. .................................................. 417/423.8
(58) Field of Classification Search ........... 417/423.12, 417/424.1
See application file for complete search history.

(56) References Cited

U.S. PATENT DOCUMENTS

| 4,523,896 A | | 6/1985 | Lhenry et al. |
| 5,127,792 A | * | 7/1992 | Katsuta et al. ............... 415/104 |
| 6,060,805 A | * | 5/2000 | Ohtake et al. ................. 310/87 |
| 6,390,789 B1 | * | 5/2002 | Grob et al. .................. 417/350 |

FOREIGN PATENT DOCUMENTS

| CA | CN-2312085 | * | 1/2001 |
| EP | 0 990 798 A1 | | 4/2000 |
| EP | 1 074 746 A2 | | 2/2001 |
| WO | WO 94/29597 | | 12/1994 |

* cited by examiner

Primary Examiner—Anthony D. Stashick
Assistant Examiner—Samuel E. Belt
(74) Attorney, Agent, or Firm—Todd Deveau; Thomas, Kayden, Horstemyer & Risley LLP

(57) ABSTRACT

A compressor unit comprises a centrifugal compressor (1) for compressing a gas, having a rotor (2) with one or more compressor impellers (3), and an electric motor (4) having a stator (5) and a rotor (6), for driving the rotor (2) of the compressor. The compressor and the electric motor are accommodated in a common gas-tight housing (7) which is provided with a gas inlet (8) and a gas outlet (9). The rotor of the compressor and the rotor of the electric motor are arranged on a common rotor shaft (10) which is mounted in magnetic bearings (11, 12, 15). The rotor shaft (10) comprises a single unit and is mounted in two radial magnetic bearings (11, 12), each in the vicinity of one end of the common rotor shaft, and one axial magnetic bearing (15), which is arranged in the vicinity of one (11) of the radial bearings.

13 Claims, 2 Drawing Sheets

COMPRESSOR UNIT COMPRISING A CENTRIFUGAL COMPRESSOR AND AN ELECTRIC MOTOR

RELATED APPLICATION

This application claims priority to and the benefit of NL1018212 filed Jun. 5, 2001.

FIELD OF THE INVENTION

The invention relates to a compressor unit, comprising a centrifugal compressor for compressing a gas, having a rotor with one or more compressor impellers, and an electric motor having a stator and a rotor for driving the rotor of the compressor, the compressor and the electric motor being accommodated in a common gas-tight housing which is provided with a gas inlet and a gas outlet, and the rotor of the compressor and the rotor of the electric motor being arranged on a common rotor shaft which is mounted in magnetic bearings.

BACKGROUND OF THE ART

A compressor unit of this type is known, for example, from WO-A-94/29597 and EP-A 1 074 746.

In the compressor unit which is known from WO-A 94/29597, a compressor impeller is arranged on both sides of the electric motor. The rotor shaft is mounted in two radial magnetic bearings, which are each arranged between the electric motor and a compressor impeller, and an axial magnetic bearing, which is likewise arranged between the electric motor and one of the compressor impellers.

In the compressor unit which is known from EP-A 1 074 746, in particular FIG. 2, the compressor impellers are arranged on one side of the electric motor. The rotor shaft comprises two parts which are connected to one another by means of a coupling. The rotor shaft is mounted in three radial magnetic bearings which are arranged at both ends of the rotor shaft and between the electric motor and the centrifugal compressor, and one axial magnetic bearing, which is arranged between the electric motor and the centrifugal compressor.

SUMMARY OF THE INVENTION

It is an object of the invention to provide an improved compressor unit of the type described in the preamble which can be of compact design and in which the bearings are readily accessible without it being necessary to remove the housing of the compressor unit.

This object is achieved by the fact that the rotor shaft comprises a single unit and is mounted in two magnetic radial bearings, each in the vicinity of one end of the common rotor shaft, and one axial magnetic bearing which is arranged in the vicinity of the one of the radial bearings.

Preferred embodiments of the compressor unit according to the invention are defined in the dependent claims.

BRIEF DESCRIPTION OF THE DRAWINGS

The invention will be explained in more detail in the following description of a number of embodiments of the compressor unit according to the invention with reference to the drawing, in which.

DETAILED DESCRIPTION OF THE INVENTION

Figure 1:
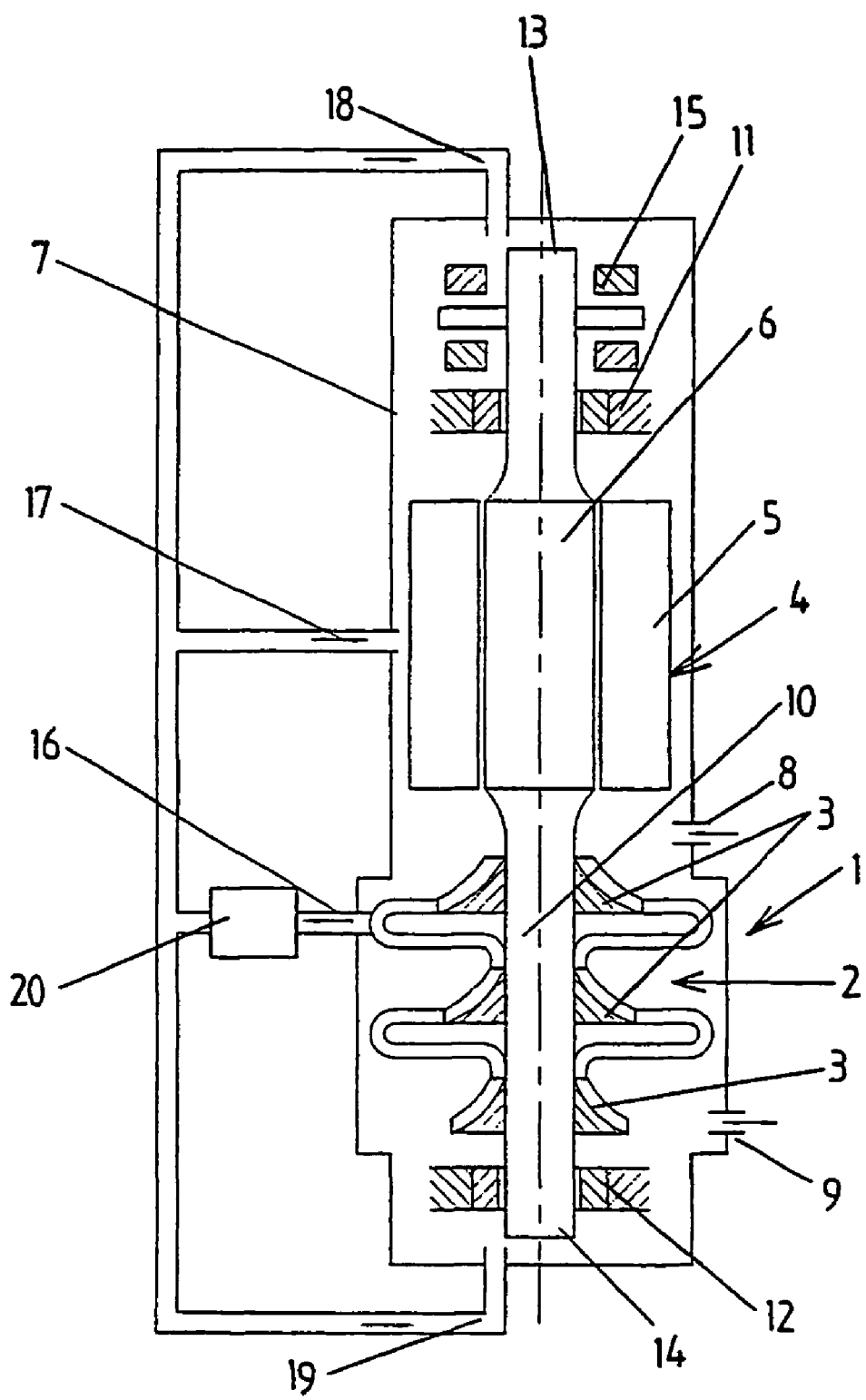
FIG. 1 diagrammatically depicts a first embodiment of the compressor unit according to the invention, and FIG. 2 diagrammatically depicts a second embodiment of the compressor unit according to the invention.

The compressor unit shown in FIG. 1 comprises a centrifugal compressor 1 for compressing a gas, for example process gas, having a rotor 2 with one or more, in this case three, compressor impellers 3, and an electric motor 4 with a stator 5 and a rotor 6 for driving the rotor 2 of the compressor. The compressor 1 and the electric motor 4 are accommodated in a common gas-tight housing 7 which is provided with a gas inlet 8 and a gas outlet 9. The housing 7 is divided in the customary way and comprises a plurality of parts which are fixedly connected to one another.

The rotor 2 of the compressor 1 and the rotor 6 of the electric motor 4 are arranged on a common rotor shaft 10 which comprises a single unit. The rotor shaft 10 is mounted in two radial magnetic bearings 11 and 12 which are each arranged in the vicinity of one end 13 and 14, respectively, of the rotor shaft 10, and one axial magnetic bearing 15, which is arranged in the vicinity of the radial bearing 11. The rotor shaft 10 is not supported between the electric motor 4 and the centrifugal compressor 1. The magnetic bearings 11, 12 and 15 will generally be electromagnetic bearings.

The design of the compressor unit with the rotor shaft which comprises a single unit and the bearings arranged only in the vicinity of the ends of the rotor shaft means that the compressor unit can be of compact structure and that the bearings are readily accessible for maintenance without the housing of the compressor unit having to be removed.

The compressor unit is preferably arranged vertically. This has the advantage that in particular the radial bearings 11 and 12 can be of relatively lightweight design, since these bearings merely have to centre the rotor shaft.

The axial bearing can also be of relatively lightweight design if it is ensured that the axial force on the rotor shaft which is produced by the compressor impellers acts counter to the force of gravity.

The vertical arrangement of the rotor shaft has the further advantage that the compressor unit takes up relatively little space in the horizontal direction.

Obviously, it is also possible for the rotor shaft to be arranged horizontally. However, the design of the compressor unit, and in particular the design of the bearings, has to be adapted to this arrangement.

The compressor impellers 3 are advantageously an integral part of the rotor shaft 10. This contrasts with traditional designs, in which separate compressor impellers are mounted on the shaft, for example by thermal shrinking. If the compressor impellers and the rotor shaft are produced from a single unit, separate pieces of impeller material, in which a rotor-shaft part has already been integrated (impeller-shaft segments), are welded to one another. The impeller-shaft segments which have been welded to one another together form the basic compressor rotor, which has to be processed further in order to form the final compressor rotor.

Preferably, the rotor 6 of the electric motor 4 is likewise an integral part of the rotor shaft.

The compressor unit is provided with a cooling system for cooling the magnetic bearings 11, 12, 15 and the electric motor 4. This cooling system comprises a line 16 which runs from the compressor and branches into a line 17 which runs to the electric motor 4 and lines 18 and 19 which run to the magnetic bearings 11, 12, 15. A filter 20 is incorporated in the line 16 which runs from the compressor. To cool the electric motor 4 and the magnetic bearings 11, 12, 15, compressed gas is tapped off at an intermediate stage of the compressor 1, is passed through the line 16 and the filter 20 and is fed in metered fashion, via the lines 17, 18 and 19, to the stator 5 of the electric motor 4 and, via the lines 18 and 19, to the magnetic bearings 11 and 15 and 12. The cooling gas is collected again inside the compressor unit and is guided to the inlet section of the compressor.

Figure 2:
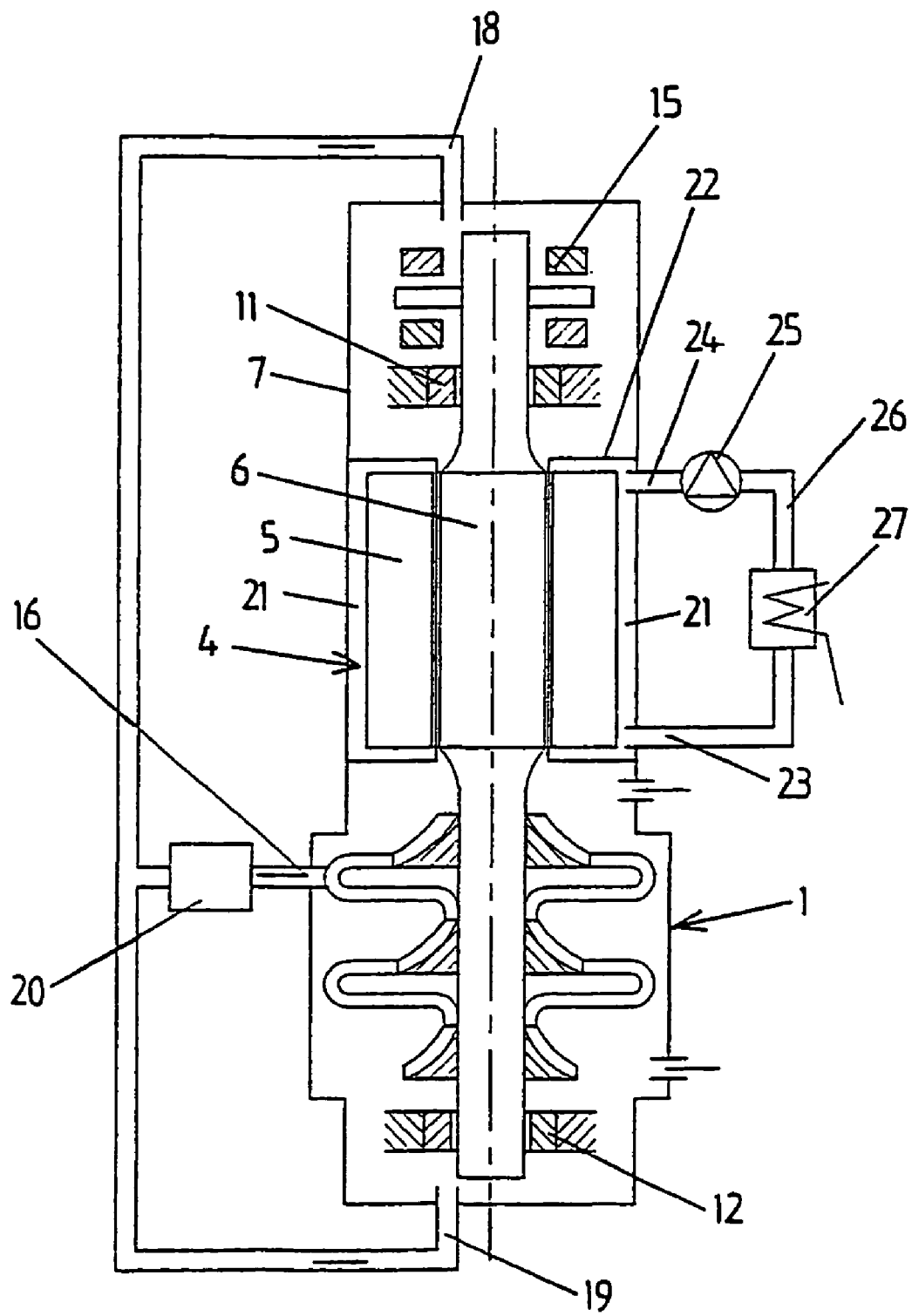

FIG. 2 shows a slightly altered embodiment of the compressor unit according to the invention. This embodiment differs from the embodiment illustrated in FIG. 1 in that the stator 5 of the electric motor 4 has a dedicated cooling system. This is to prevent the stator 5 of the electric motor being affected by any aggressive constituents which may be present in the gas which is to be compressed.

The cooling system for the magnetic bearings 11, 12, 15 is otherwise identical to the cooling system for the magnetic bearings 11, 12, 15 of the embodiment shown in FIG. 1.

The stator 5 of the electric motor 4 is incorporated in a stator chamber 21, which is separate from the remainder of the interior of the compressor unit and is delimited by that section of the wall of the housing 7 of the compressor unit which surrounds the stator 5 and a partition 22, which adjoins this wall section and extends in the radial direction on both sides of the stator 5 and also between the stator 5 and the rotor 6 of the electric motor 4. This partition 22 is also known as a can. The stator chamber 21 is provided with a feed 23 and a discharge 24 for a separate cooling medium which is circulated in a cooling circuit 26 by a pump 25. A heat exchanger 27 is incorporated in the cooling circuit 26.

The partition (can) 22 may be designed in two ways.

The partition 22 may be designed in such a manner that the wall of the stator chamber 21 is able to withstand the design pressure of the compressor.

In another embodiment of the partition 22, at least that section of the partition 22 which extends between the stator 5 and the rotor 6 of the electric motor 4 is of thin-walled design. The stator chamber is incorporated in the closed cooling circuit, which is completely filled with a cooling liquid, in such a manner that the cooling system of the stator 5 of the electric motor 4 as a whole is able to withstand the design pressure of the compressor unit. This design principle is based on a combination of a form fit of the thin-walled partition 22 and the poor compressibility of the cooling medium.

The advantage of the latter embodiment, in which the partition 22 is of thin-walled design in the area between the stator 5 and the rotor 6, is that a greater output per unit area of the motor can be achieved, with reduced eddy current losses.

What is claimed is:

1. A compressor unit, comprising a centrifugal compressor for compressing a gas, having a rotor with one or more compressor impellers, and an electric motor having a stator and a rotor for driving the rotor of the compressor, the compressor and the electric motor being accommodated in a common gas-tight housing which is provided with a gas inlet and a gas outlet, and the rotor of the compressor and the rotor of the electric motor being arranged on a common rotor shaft which is mounted in magnetic bearings, the rotor shaft comprising a single unit and the rotor shaft being mounted in two magnetic radial bearings, each in the vicinity of one end of the common rotor shaft, and one axial magnetic bearing which is arranged in the vicinity of the one of the radial bearings in the vicinity of one end of the common rotor shaft.

2. The compressor unit of claim 1, in which the rotor shaft is arranged vertically.

3. The compressor unit of claim 1, in which the compressor impeller or impellers are an integral part of the rotor shaft.

4. The compressor unit of claim 1, provided with a cooling system for cooling the magnetic bearings and the electric motor.

5. The compressor unit of claim 4, provided with lines which run from the compressor to the magnetic bearings for the purpose of conveying gas from the compressor to the magnetic bearings for the purpose of cooling these bearings.

6. The compressor unit of claim 5, in which a filter is incorporated in the lines running from the compressor to the magnetic bearings.

7. The compressor unit according of claim 5, in which a filter is incorporated in the line running from the compressor to the electric motor.

8. The compressor unit of claim 4, provided with a line which runs from the compressor to the electric motor for the purpose of conveying gas from the compressor to the electric motor for the purpose of cooling the electric motor.

9. The compressor unit of claim 4, in which the stator of the electric motor is provided with a dedicated cooling system for cooling the stator by means of a separate cooling medium.

10. The compressor unit of claim 9, in which the stator of the electric motor is accommodated in a stator chamber which is separate from the remainder of the interior of the compressor unit and is delimited by that section of the wall of the housing of the compressor unit which surrounds the stator and a partition which adjoins this wall section and extends in the radial direction on both sides of the stator and also between the stator and the rotor of the electric motor.

11. The compressor unit of claim 10, in which the stator chamber is provided with connections for supplying and discharging the separate cooling medium.

12. The compressor unit of claim 10, in which the wall of the stator chamber is designed in such a manner that it is able to withstand the design pressure of the compressor unit.

13. The compressor unit of claim 10, in which at least that section of the partition of the stator chamber which extends between the stator and the rotor of the electric motor is of thin-walled design, the stator chamber is incorporated in a closed cooling circuit which is completely filled with a cooling liquid, and the cooling system of the stator of the electric motor as a whole is able to withstand the design pressure of the compressor unit.

* * * * *